7200X
S. Ustick,
Saw.
Patented Aug. 11, 1832.
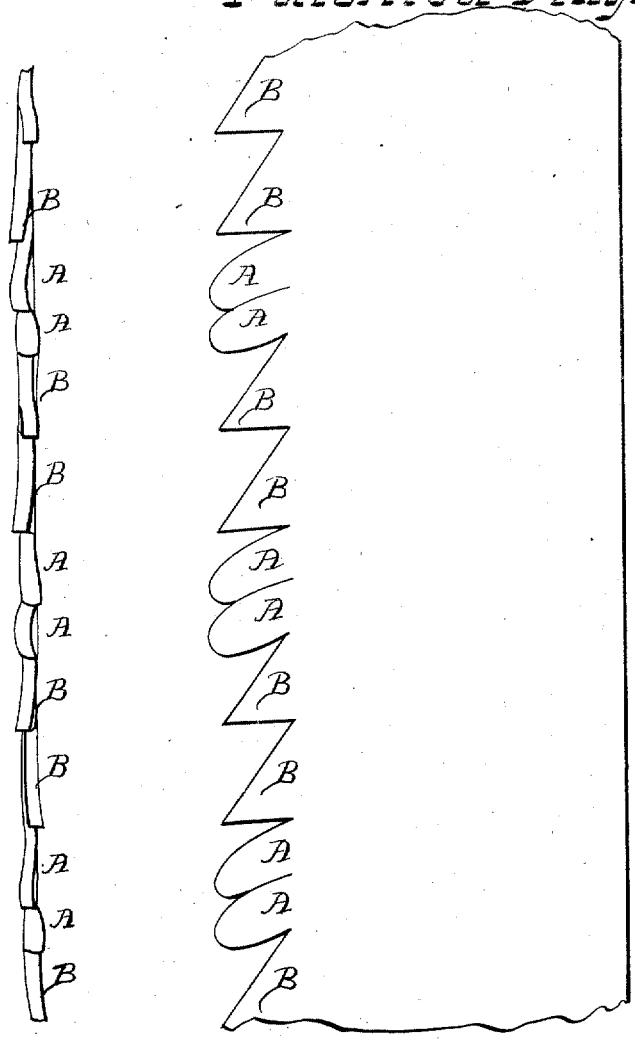
AM. PHOTO-LITHO. CO. N.Y. (OSBORNE'S PROCESS)

7200X

Stephen Ustick
Improvement in Saws—

The Schedule referred to in these Letters Patent and making part of the same containing a description in the words of the said Stephen Ustick himself of his improvement in saws To all to whom these Presents shall come Be it Known, That I, Stephen Ustick of Washington City in the county of Washington and District of Columbia, have invented a new and useful improvement in Saws, and that the following is a full and exact description of the construction and operation of said improvement as invented by me —

This improvement in the first place consists of two outside rows of teeth, which I call side cutters of the following form and position. These are round at their end instead of pointed, filed to an edge on the end, every other one contrary wise so that each side of the saw, has to it an equal number of the flat side of them, and are longer than the other teeth so that there is always a cut on each side of them to prevent the resistance to their sides which is occasioned to other saws — The side cutters are made of teeth next each other only two being together one to each row. Between each pair there is a number of teeth of the common construction. In saws used chiefly ~~used~~ for cross cutting there should be as many of the cutters as there are other teeth, but to saws used chiefly or altogether for ripping, but a small proportion of them is required. The cutters are set of the same level as the other teeth.

The improvement in the second place consists in the outside of the teeth being made perfectly parallel to a line a little below the points of the lower teeth to affect smooth & level cutting. —

The improvement operates to affect surfaces much smoother & more level and to produce a much greater 30 7200X - Aug 11, 1832 quantity of more than other sums

Witnesses

Saml. Williams

S. B. White

Stephen Girard

Exd. H.G.

396 wds

Drawing made